(12) United States Patent
Damang

(10) Patent No.: US 8,286,955 B2
(45) Date of Patent: Oct. 16, 2012

(54) STEADY REST

(75) Inventor: Markus Damang, Albstadt (DE)

(73) Assignee: Schunk GmbH & Co. KG Spann-und Greiftechnik, Lauffen (DE)

( * ) Notice: Subject to any disclaimer, the term of this patent is extended or adjusted under 35 U.S.C. 154(b) by 394 days.

(21) Appl. No.: 12/742,199

(22) PCT Filed: Oct. 27, 2008

(86) PCT No.: PCT/EP2008/009062
§ 371 (c)(1),
(2), (4) Date: May 10, 2010

(87) PCT Pub. No.: WO2009/059708
PCT Pub. Date: May 14, 2009

(65) Prior Publication Data
US 2010/0252976 A1    Oct. 7, 2010

(30) Foreign Application Priority Data
Nov. 8, 2007  (EP) .................................. 07021706

(51) Int. Cl.
*B25B 5/12*    (2006.01)
(52) U.S. Cl. ............................ 269/228; 269/165; 269/58
(58) Field of Classification Search .................. 269/3, 6, 269/228, 95
See application file for complete search history.

(56) References Cited

U.S. PATENT DOCUMENTS

| | | | | |
|---|---|---|---|---|
| 1,733,773 A | * | 10/1929 | Benedict | 269/6 |
| 1,910,833 A | * | 5/1933 | Hippey | 29/238 |
| 2,591,636 A | * | 4/1952 | Thompson | 81/112 |
| 5,201,501 A | * | 4/1993 | Fassler | 269/32 |
| 6,458,022 B1 | * | 10/2002 | Folz | 451/365 |
| 6,665,919 B1 | * | 12/2003 | Kurtz et al. | 29/262 |
| 7,597,035 B2 | * | 10/2009 | Rehm | 82/157 |
| 2008/0289463 A1 | * | 11/2008 | Rehm | 82/164 |
| 2009/0001643 A1 | * | 1/2009 | Rehm | 269/55 |

FOREIGN PATENT DOCUMENTS

| | | | |
|---|---|---|---|
| DE | 3137149 A1 | * | 4/1983 |
| DE | 35 43 806 A1 | | 6/1987 |
| DE | 37 19 103 A1 | | 12/1988 |
| DE | 199 50 706 A1 | | 5/2001 |
| EP | 0 562 180 A1 | | 9/1993 |
| EP | 0 562 180 B1 | | 11/1995 |

* cited by examiner

*Primary Examiner* — Robert Canfield
*Assistant Examiner* — Brent W Herring
(74) *Attorney, Agent, or Firm* — Berenato & White, LLC

(57) ABSTRACT

The invention relates to a steady rest for clamping and/or for holding a workpiece (W) on a machine tool, comprising three holding members (3, 4, 5) mounted in a housing (2) and displaceable in a common plane, two of which are designed as two-armed levers pivotably supported in the housing (2), and the central holding member (5) is guided in a straight line. The two outer holding members (3, 4) are kinematically connected respectively to the central holding member (5) via an angle lever (10, 11) so that with an opening movement of the central holding member (5) the outer holding members (3, 4) are pivoted apart from one another. The angle levers (10, 11) are linked rotatably onto the central holding member (5), respectively the one leg of the angle levers (10, 11) being connected to the associated outer holding member (3, 4), and the other leg being connected to the housing (2) by means of gate/pin arrangements.

15 Claims, 3 Drawing Sheets

STEADY REST

CROSS-REFERENCE TO RELATED APPLICATIONS AND CLAIM TO PRIORITY

Figure 1:
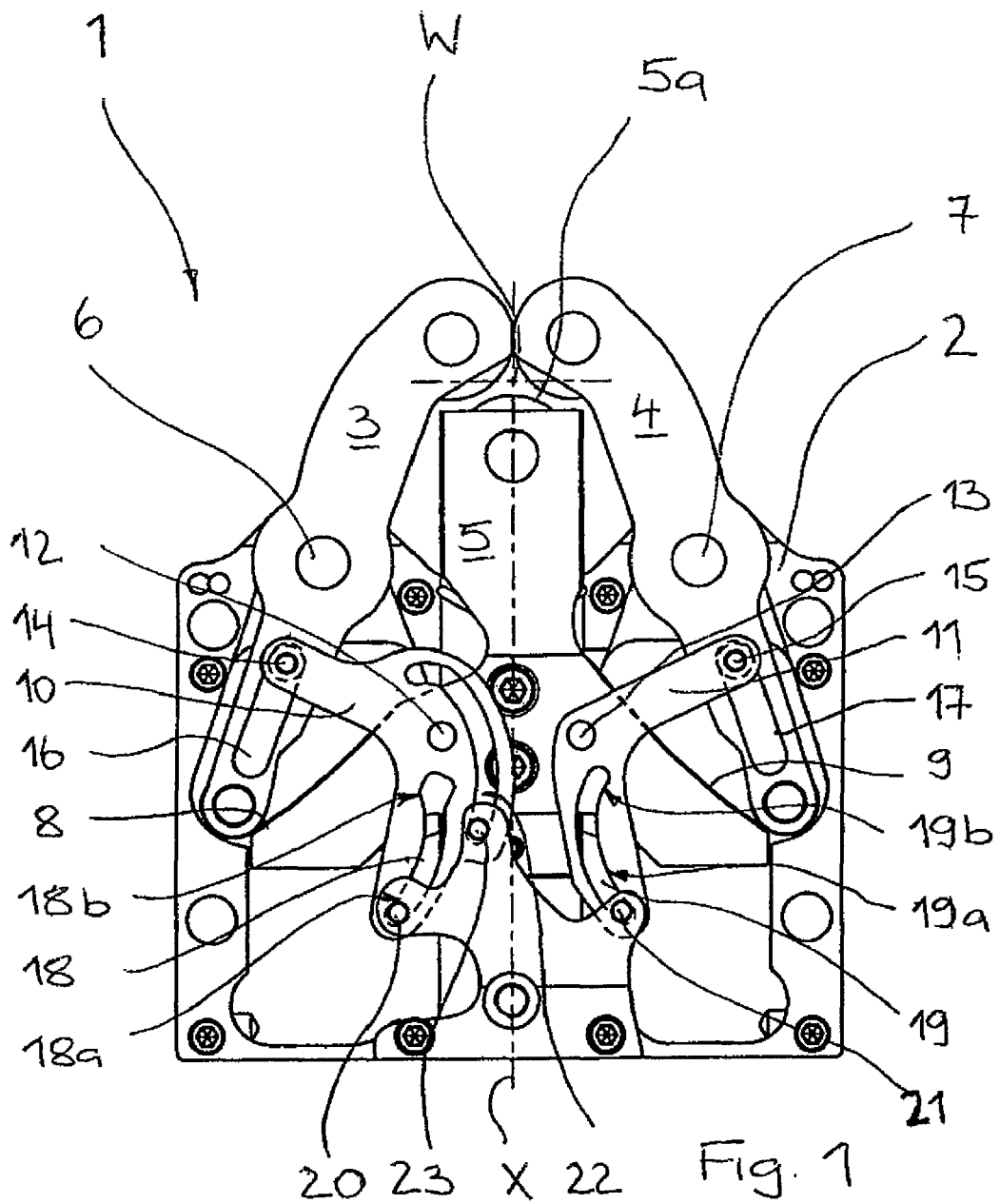

This application is a National Phase of International Application No. PCT/EP2008/009062 filed Oct. 27, 2008 and relates to European Patent Application No. 07021706.2 filed Nov. 8, 2007, of which the disclosures are incorporated herein by reference and to which priority is claimed.

The present invention relates to a steady rest for clamping and/or for holding a workpiece on a machine tool, comprising three holding members mounted in a housing and displaceable in a common plane, of which the two outer holding members are designed as two-armed levers disposed in a mirror image to one another and supported pivotably within the housing, and the central holding member is guided moveably radially in a straight line to a tool axis, the central holding member having control surfaces which interact with the free ends of the outer holding members in order to convert a closing movement of the central holding member directed towards the tool into a pivot movement of the outer holding members in the clamping position of the latter, and the two outer holding members being kinematically connected respectively to the central holding member via an angle lever so that with an opening movement of the central holding member directed away from the workpiece the outer holding members are pivoted apart from one another into their open position.

Steady rests of this type for clamping and/or for holding workpieces on machine tools, and in particular turning machines, are known, for example, from EP 0 562 180 B1. With these steady rests the outer holding members designed as angle levers are mounted pivotably on the housing, their free inner ends resting against control surfaces of the central holding member and interacting with the latter so that an axial clamping movement of the central holding member is converted into a pivoting closing or clamping movement of the outer holding members. Furthermore, the previously known steady rest is equipped with a return function which ensures that the inner ends of the outer holding members remain resting against the control surfaces, and so are automatically brought back into their open position when the central holding member is moved axially away from the tool. For this purpose a control lever, likewise designed as an angle lever, is assigned to every outer holding member, said control lever carrying on its one end a pin which is guided in a straight gate within the inner lever of the outer holding member. The other end of the control lever is mounted pivotably in a corner region of the housing, and in the central region of the control lever a recess is provided in which a pin held on the central holding member is guided. This type of coupling of the outer holding members to the central holding member via the control lever means that due to the contact between the recess and the pin the control lever implements a force-controlled pivot movement by means of which the outer holding members are pivoted out into their open position when the central holding member is drawn back.

The known steady rests have absolutely proved their worth in practice. However, there is a need to design the return more simply, and in particular to shorten the guide paths.

Correspondingly, it is an object of the present invention to design a steady rest of the type specified at the start such that the guide paths are shortened and the design is simple. Here one of the holding members should be moveable beyond the position corresponding to the open position of the steady rest in order to enlarge the opening for insertion and removal of a workpiece.

This object is achieved according to the invention with a steady rest of the type specified at the start in that the angle levers are linked rotatably onto the central holding member and respectively the one leg of the angle levers is connected to the associated outer holding member, and the other leg is connected to the housing by means of gate/pin arrangements.

Therefore, according to the invention provision is made such that the angle lever by means of which the outer holding members are coupled to the central holding member, is mounted pivotably on the central holding member, and here in particular adjacent to the control surfaces of the latter, and the free ends of the angle lever are connected to the housing and the outer holding members by means of gate/pin arrangements. In this way it is possible for the transmission paths to be short due to the short lever arms between the link-on point on the central holding member on the one hand, and the gates on the other hand, by means of which direction transmission of the movement is achieved, and so also the guiding is made easier.

According to one preferred embodiment provision is made here such that the angle levers are respectively linked on rotatably at the intersection point of their two legs on the central holding member.

In a further embodiment of the invention provision can be made such that on the inner lever arms of the outer holding members a gate, in particular a straight gate, is respectively provided in which a pin is moveably guided on the end of the one leg of the associated angle lever. This type of simple gate/pin guide is sufficient in order to convert the straight movement of the central holding member into a corresponding pivot movement of the outer holding members.

On the other hand, in most cases it is necessary for the gates of the gate/pin arrangements to extend in a curve between the housing and the angle lever. Advantageously here, the curved gate is formed in the leg of the angle levers engaging with the housing, and a pin provided on the housing engages with the gate. The advantage of the design of the gate on the angle lever is that the gate can be produced easily. In kinematic reverse an arrangement is of course also conceivable with which the gate is formed in the housing and the pin is held on the angle lever.

In order to obtain the most direct guiding possible, the pin held on the housing should be provided close to the axis of movement of the central holding member, in the closed position of the steady rest the pin then supposedly engaging with the end of the curved gate positioned at the free end of the angle lever.

According to a further embodiment of the invention provision can be made such that the curved gates respectively have a first section which corresponds to a path of movement of the outer holding members between the open position of the latter and the closed position of the latter, and such that adjoining the end of the first sections corresponding to the open position of the steady rest there is respectively a second section which corresponds to a further path of movement of the outer holding members between the open position of the latter and an end position, the second section of the gate being designed to guide the first angle lever such that an axial movement of the central holding member beyond its position corresponding to the open position of the steady rest is associated with a force-controlled pivot movement of the associated outer holding member into its end position, and the second section of the gate for guiding the second angle lever forms a receiving pocket which enables free moveability of the second angle lever, and the housing and the second angle lever are connected to one another by a further gate/pin arrangement such that the outer holding member connected to the second angle lever is pivoted out, force-controlled, beyond its open position when the central holding member is moved away axially from the tool beyond its position corresponding to the open position of the steady rest, and the outer holding member connected to the second angle lever being further pivoted out in its end position than the other outer holding member.

With the steady rest designed in this way the two outer holding members can be pivoted out beyond their normally open position, the second holding member being further pivoted out in its end position than the first holding member. Therefore, the curved gates, by means of which the angle lever is guided on the housing, in a first section which corresponds to the movement of the outer holding members between their normally open position and their clamping position, are substantially designed in a mirror image so that the outer holding members are pivoted parallel to one another. On the other hand, the adjacent second gate sections are different in design. Here the second gate section on the one angle lever is designed such that the outer holding member assigned to it is continuously pivoted into its end position, force-controlled. In contrast, the second gate section of the other angle lever is designed as a receiving pocket which allows a further pivot movement of the second outer holding member, but does not guide with force-control. In order to produce the further pivot movement into the end position, the second angle lever is connected to the housing by a second gate/pin arrangement which actively assumes the guiding function and pivots out the second angle lever, and so also the associated outer holding member into the end position of the latter when the central holding member is moved away from the tool beyond the position corresponding to the normal open position of the steady rest. In other words, the second outer holding member is guided by two gate/pin arrangements on the housing, the one gate/pin arrangement controlling the normal pivot movement from the closed position into the open position of the steady rest, and the second gate/pin arrangement the further pivot movement beyond the open position. In this way it is achieved that the movement of the second outer holding member can be controlled easily, and complicated control curves with sharp kinks can be avoided.

This control of the movement of the angle lever on the housing with two gate/pin arrangements can also be used if the angle lever is not pivotably mounted on the central holding member. Correspondingly, according to a further aspect of the invention provision is made such that guiding on the housing is by means of gate/pin arrangements with curved gates, and the curved gates respectively have a first section which corresponds to a path of movement of the outer holding members between the open position of the latter and the closed position of the latter, and that adjoining the end of the first sections corresponding to the open position of the steady rest is a second section respectively which corresponds to a further path of movement of the outer holding members between the open position of the latter and an end position, the second section of the gate being designed for guiding the first angle lever such that an axial movement of the central holding member is associated with a force-controlled pivot movement of the associated outer holding member into its end position beyond its position corresponding to the open position of the steady rest, and the second section of the gate for guiding the second angle lever forms a receiving pocket which enables free moveability of the second angle lever, and the housing and second angle lever are connected to one another by a further gate/pin arrangement such that the outer holding member connected to the second angle lever is pivoted out, force-controlled, beyond its open position when the central holding member is moved away axially from the tool beyond its position corresponding to the open position of the steady rest, and the outer holding member connected to the second angle lever being further pivoted out in its end position than the other outer holding member.

Figure 2:
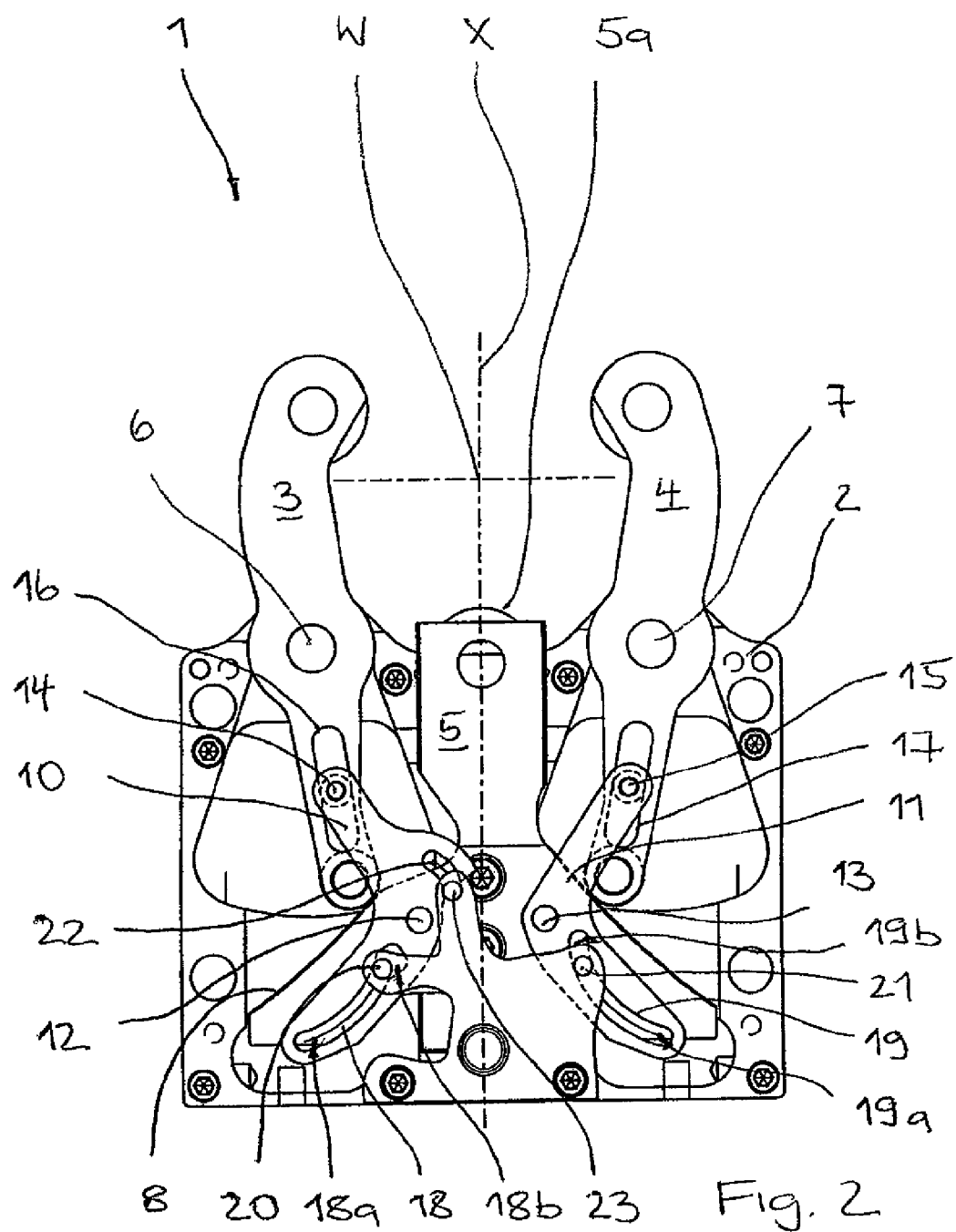
Figure 3:
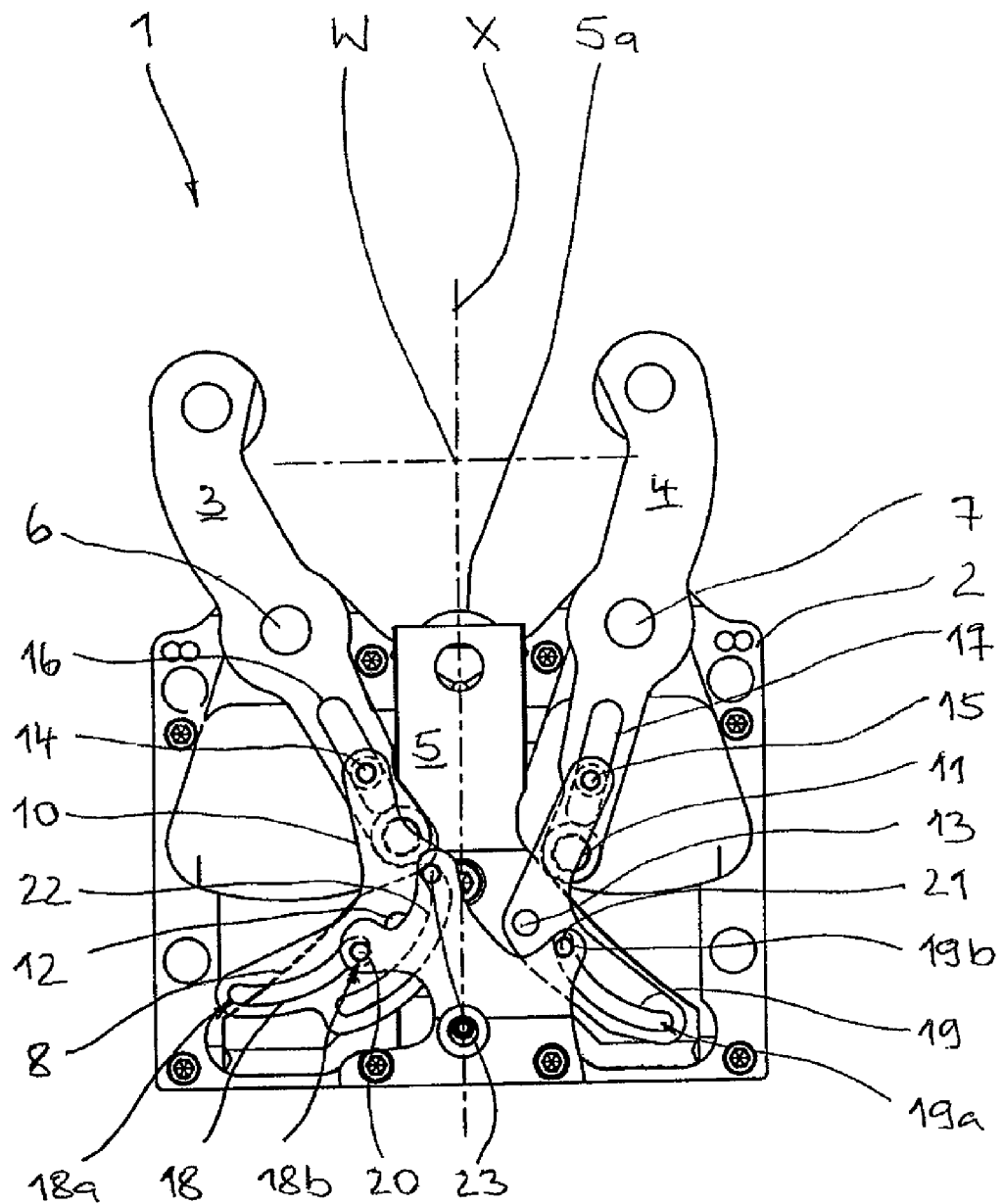

With regard to further advantageous embodiments of the invention reference is made to the sub-claims and to the following description of an exemplary embodiment with reference to the attached drawings. The drawings show as follows:

FIG. 1 a steady rest according to the present invention in its clamping position, FIG. 2 the steady rest of FIG. 1 in its open position, and FIG. 3 the steady rest of FIG. 2, the left-hand outer holding member being pivoted out beyond the open position.

In FIGS. 1 to 3 a steady rest 1 is shown which serves to clamp and/or to hold a workpiece W on a machine tool, and here in particular a turning machine. The steady rest 1 has a housing 2 in which three holding members 3, 4, 5 displaceable in a common plane are mounted. Here the two outer holding members 3 and 4 are designed as angle levers which are mounted pivotably in the housing 2 in their central region by means of pivot pins 6, 7. The central holding member 5 is disposed centrally between the two outer holding members 3, 4 and guided with displacement radially to the workpiece W. In the drawing only the clamping position of the workpiece W is shown which does not change, independently of the size of the workpiece to be clamped. The displacement is implemented by means of a positioning mechanism not shown in detail.

The central holding member 5 has on its face facing towards the tool a clamping surface 5a. Moreover, control surfaces 8, 9 are formed on the central holding member 5 on which the free ends of the two outer holding members 3 and 4 projecting into the housing 2 rest. The control surfaces 8, 9 and the free ends of the outer holding members 3, 4 interact here in order to convert a straight movement of the central holding member 5 towards the tool W into a pivot movement of the outer holding members 3, 4, and thus to bring the latter into the clamping position shown in FIG. 1.

With the steady rest 1 according to the invention the outer holding members 3, 4 are additionally coupled to the central holding member 5 in such a way that the outer holding members 3, 4 are automatically brought back into their open position shown in FIG. 2 when the central holding member 5 is moved downwards out of its clamping position (FIG. 1) away from the tool W in the drawing. For this return there is assigned to every outer holding member 3, 4 an angle lever 10, 11 which is mounted pivotably on the central holding member 5 close to the control surfaces 8, 9 of the latter by means of a pivot pin 12, 13. The one end of every angle lever 10, 11 is provided with a pin 14, 15 which engages in a straight gate 16, 17 which is formed in the inner lever of the associated outer holding member 4, 5 projecting into the housing 2 and is guided within the latter. The other leg of each angle lever 10, 11 is guided on the housing 2 by a gate/pin arrangement. Specifically, within the leg a curved gate 18, 19 is formed in which a pin 20, 21 held on the housing 2 is guided. As can easily be seen in the drawing, the pin 20, 21 is provided close to the longitudinal axis X of the steady rest 1. The gates 18, 19 of the two angle levers 10, 11 are designed such that the outer holding members 3, 4 also inevitably rest on the control surfaces 8, 9 of the central holding member 5 upon a return of the latter. Specifically, when the central holding member 5 is drawn back the pivot pins 12, 13 provided on the latter and the associated angle levers 10, 11 are also moved axially. This axial movement is converted into an additional pivot movement of the angle lever 10, 11 in relation to the central holding member 5 by the gate/pin arrangement between the angle lever 10, 11 and the housing 2. By means of the pins 14, 15 engaging in the straight gates 16, 17 the outer holding members 3, 4 are inevitably carried along here in such a way that their inwardly lying ends also rest against the control surfaces 8, 9 of the central holding member 5 upon return of the latter, and the steady rest 1 is open in the position of the central holding member 5 shown in FIG. 2.

With the steady rest shown provision is made such that the two outer holding members 3, 4 can be pivoted out further beyond their open position shown in FIG. 2. Provision is made here such that the outer holding member 3, on the left in the drawing, is further pivoted out in its end position than the right-hand outer holding member 4. In order to implement this a respective second gate section 18b, 19a, which is different in design with the gates 18, 19 of the two angle levers 10, 11, adjoins a first section 18a, 19a of the two gates 18, 19 which controls the movement between the clamping position and the open position. With the gate 19 of the angle lever 11 assigned to the right-hand outer holding member 4 the second gate section 19b is designed such that the associated right-hand outer holding member 4 is pivoted, force-controlled, out of the open position shown in FIG. 2 into its end position shown in FIG. 3 when the central holding member 5 is drawn back further from its open position. On the other hand, the second gate section 18b in the other angle lever 10 is designed as a receiving pocket which is designed such that the pin 20 engaging in the gate 18 does not experience any further guiding on the housing 2, and the angle lever 10 can therefore move freely. In addition, the left-hand angle lever 10 on the housing 2 is guided by a second gate/pin arrangement with a gate 22 provided in the angle lever 10 and a pin 23 guided therein and held on the housing 2. This second gate/pin arrangement is designed such that it assumes the guiding of the angle lever 10 and so of the movement of the left-hand outer holding member 3 in such a way that the left-hand outer holding member 3 is further pivoted out of the open position shown in FIG. 2 into the end position shown in FIG. 3 when the central holding member 5 is further drawn back from its position corresponding to the open position of the steady rest 1 (see FIG. 2), as shown in FIG. 3.

I claim:

1. A steady rest for clamping and/or for holding a workpiece (W) on a machine tool, comprising three holding members (3, 4, 5) mounted in a housing (2) and displaceable in a common plane, of which the two outer holding members (3, 4) are designed as two-armed levers disposed in a mirror image to one another and supported pivotably within the housing (2), and the central holding member (5) is guided moveably radially in a straight line to a tool axis, the central holding member (5) having control surfaces (8, 9) which interact with the free ends of the outer holding members (3, 4) in order to convert a closing movement of the central holding member (5) directed towards the tool axis (W) into a pivot movement of the outer holding members (3, 4) in the clamping position of the latter, and the two outer holding members (3, 4) being kinematically connected respectively to the central holding member (5) via an angle lever (10, 11) so that with an opening movement of the central holding member (5) directed away from the workpiece the outer holding members (3, 4) are pivoted apart from one another into their open position, characterised in that the angle levers (10, 11) are linked rotatably to the central holding member (5) and respectively the one leg of the angle levers (10, 11) is connected to the associated outer holding member (3, 4), and the other leg is connected to the housing (2) by means of gate/pin arrangements.

2. The steady rest according to claim 1, characterised in that the angle levers (10, 11) are respectively linked to the central holding member (5) at the intersection point of their two legs.

3. The steady rest according to claim 1, characterised in that on the inner lever arms of the outer holding members (3, 4) a gate (16, 17) is respectively provided in which a pin (14, 15) is moveably guided on the end of the one leg of the associated angle lever (10, 11).

4. The steady rest according to claim 1, characterised in that the gates (18, 19) of the gate/pin arrangements are curved in design between the housing (2) and the angle lever (10, 11).

5. The steady rest according to claim 4, characterised in that the curved gate (18, 19) is respectively formed in the leg of the angle levers (10, 11) engaging with the housing (2), in which curved gate a pin (20, 21) provided on the housing (2) is guided.

6. The steady rest according to claim 5, characterised in that the pin (20, 21) is provided on the housing (2) close to the axis of movement of the central holding member (5).

7. The steady rest according to claim 6, characterised in that in the closed position of the steady rest (1) the pin (20, 21) engages with the end of the curved gate (18, 19) positioned on the free end of the associated angle lever (10, 11).

8. The steady rest according to claim 4, characterised in that the curved gates (18, 19) respectively have a first section (18a, 19a) which corresponds to a path of movement of the outer holding members (3, 4) between the open position of the latter and the closed position of the latter, and that adjoining the end of the first sections (18a, 19a) corresponding to the open position of the steady rest (1) there is respectively a second section (18b, 19b) which corresponds to a further path of movement of the outer holding members (3, 4) between the open position of the latter and an end position, the second section (19b) of the gate (19) being designed to guide the first angle lever (11) such that an axial movement of the central holding member (5) beyond its position corresponding to the open position of the steady rest (1) is associated with a force-controlled pivot movement of the associated outer holding member (4) into its end position, and the second section (18b) of the gate (18) for guiding the second angle lever (10) forms a receiving pocket which enables free moveability of the second angle lever (10), and the housing (2) and the second angle lever (10) are connected to one another by a further gate/pin arrangement such that the outer holding member (3) connected to the second angle lever (10) is pivoted out, force-controlled, beyond its open position when the central holding member (5) is moved away axially from the tool (W) beyond its position corresponding to the open position of the steady rest (1), and the outer holding member (3) connected to the second angle lever (10) being pivoted out further in its end position than the other outer holding member (4).

9. A steady rest for clamping and/or for holding a workpiece (W) on a machine tool, comprising three holding members (3, 4, 5) mounted in a housing (2) and displaceable in a common plane, of which the two outer holding members (3, 4) are designed as two-armed levers disposed in a mirror image to one another and supported pivotably within the housing (2), and the central holding member (5) is guided moveably radially in a straight line to a tool axis (W), the central holding member (5) having control surfaces (8, 9) which interact with the free ends of the outer holding members (3, 4) in order to convert a closing movement of the central holding member (5) directed towards the tool axis (W)

into a pivot movement of the outer holding members (3, 4) in the clamping position of the latter, and the two outer holding members (3, 4) being kinematically connected respectively to the central holding member (5) via an angle lever (10, 11) so that with an opening movement of the central holding member (5) directed away from the workpiece the outer holding members (3, 4) are pivoted apart from one another into their open position, characterised in that the angle levers are guided on the housing (2) by means of gate/pin arrangements with curved gates (18, 19), and the curved gates (18, 19) respectively have a first section (18a, 19a) which corresponds to a path of movement of the outer holding members (3, 4) between the open position of the latter and the closed position of the latter, and that adjoining the end of the first sections (18a, 19a) corresponding to the open position of the steady rest (1) there is respectively a second section (18b, 19b) which corresponds to a further path of movement of the outer holding members (3, 4) between the open position of the latter and an end position, the second section (19b) of the first gate (19) being designed to guide the first angle lever (11) such that an axial movement of the central holding member (5) beyond its position corresponding to the open position of the steady rest (1) is associated with a force-controlled pivot movement of the associated outer holding member (4) into its end position, and the second section (18b) of the second gate (18) for guiding the second angle lever (10) forms a receiving pocket which enables free moveability of the second angle lever (10), and the housing (2) and the second angle lever (10) are connected to one another by a further gate/pin arrangement such that the outer holding member (3) connected to the second angle lever (10) is pivoted out, force-controlled, beyond its open position when the central holding member (5) is moved away axially from the tool (W) beyond its position corresponding to the open position of the steady rest (1), and the outer holding member (3) connected to the second angle lever (10) being further pivoted out in its end position than the other outer holding member (4).

10. The steady rest according to claim 9, characterised in that the angle levers (10, 11) are linked rotatably onto the central holding member (5), and respectively the one leg of the angle levers (10, 11) is connected to the associated outer holding member (3, 4,) and the other leg is connected to the housing (2) by means of gate/pin arrangements.

11. The steady rest according to claim 10, characterised in that the angle levers (10, 11) are respectively rotatably linked onto the central holding member (5) at the intersection point of their two legs.

12. The steady rest according to claim 9, characterised in that on the inner lever arms of the outer holding members (3, 4) a gate (16, 17) is respectively provided in which a pin (14, 15) engages on the end of the one leg of the associated angle lever (10, 11) and is moveably guided.

13. The steady rest according to claim 9, characterised in that the curved gate (18, 19) is respectively formed in the leg of the angle levers (10, 11) engaging with the housing (2), in which a pin (20, 21) provided on the housing (2) is guided.

14. The steady rest according to claim 13, characterised in that the pin (20, 21) is provided on the housing (2) close to the axis of movement of the central holding member (5).

15. The steady rest according to claim 14, characterised in that in the closed position of the steady rest the pin (20, 21) engages with the end of the curved gate (18, 19) positioned on the free end of the angle lever (10, 11).

* * * * *